(12) United States Patent
Miyajima et al.

(10) Patent No.: US 10,809,390 B2
(45) Date of Patent: Oct. 20, 2020

(54) POSITIONING APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Akira Miyajima, Kariya (JP); Katsuhiro Matsuoka, Nagakute (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 160 days.

(21) Appl. No.: 15/576,866

(22) PCT Filed: Jun. 10, 2016

(86) PCT No.: PCT/JP2016/002806
§ 371 (c)(1),
(2) Date: Nov. 27, 2017

(87) PCT Pub. No.: WO2016/203744
PCT Pub. Date: Dec. 22, 2016

(65) Prior Publication Data
US 2018/0172841 A1 Jun. 21, 2018

(30) Foreign Application Priority Data
Jun. 16, 2015 (JP) .................................. 2015-121431

(51) Int. Cl.
*G01S 19/47* (2010.01)
*G01S 19/49* (2010.01)
(Continued)

(52) U.S. Cl.
CPC ............ *G01S 19/47* (2013.01); *G01C 21/165* (2013.01); *G01C 21/28* (2013.01); *G01S 19/49* (2013.01)

(58) Field of Classification Search
CPC ....... G01S 19/47; G01S 19/49; G01C 21/165; G01C 21/24; G01C 21/28
See application file for complete search history.

(56) References Cited

U.S. PATENT DOCUMENTS 5,155,688 A * 10/1992 Tanaka .................... G01C 21/30
340/988
8,793,090 B2 * 7/2014 Oohashi .................. G01C 21/30
701/23
(Continued)

FOREIGN PATENT DOCUMENTS

JP H07248230 A 9/1995
JP 3848712 B2 11/2006
(Continued)

OTHER PUBLICATIONS

Jun-ichi Meguro et al., "Positioning Technique Based on Vehicle Trajectory Using GPS Raw Data and Low-cost IMU", International Journal of Automotive Engineering 3, (2012) pp. 75-80.

*Primary Examiner* — Gregory C. Issing
(74) *Attorney, Agent, or Firm* — Harness, Dickey & Pierce, P.L.C.

(57) ABSTRACT

A positioning apparatus includes: a satellite positioning device calculating a satellite positioning coordinate based on a navigation signal received by a navigation signal receiver; a movement quantity calculator acquiring a signal from an inertial sensor and sequentially calculating a movement quantity of the movable object by inertial navigation from receiving a navigation signal until receiving the signal from the inertial sensor; a virtual reference point determinator sequentially determining a virtual reference point after (Continued)

receiving the navigation signal; and a position determinator determining the position of the movable object sequentially based on the movement quantity of the movable object from the virtual reference point. The virtual reference point determinator determines that the virtual reference point is obtained by multiplying respective weighting factors on the position of the movable object and the satellite positioning coordinate, and increases the weighting factor used to multiply the satellite positioning coordinate.

7 Claims, 6 Drawing Sheets

(51) Int. Cl.
*G01C 21/16* (2006.01)
*G01C 21/28* (2006.01)

(56) References Cited

U.S. PATENT DOCUMENTS

| 2014/0070986 A1* | 3/2014 | Gao ..................... G01C 21/165 |
| | | 342/357.3 |
| 2014/0104101 A1* | 4/2014 | Mizuochi ................ G01S 19/47 |
| | | 342/357.3 |
| 2014/0365117 A1* | 12/2014 | Okamura ................ G01S 19/00 |
| | | 701/469 |

FOREIGN PATENT DOCUMENTS

| JP | 2007064853 A | 3/2007 |
| JP | 2007127439 A | 5/2007 |
| JP | 2013113789 A | 6/2013 |
| JP | 2013122406 A | 6/2013 |

* cited by examiner

POSITIONING APPARATUS

CROSS REFERENCE TO RELATED APPLICATIONS

This application is a U.S. National Phase Application under 35 U.S.C. 371 of International Application No. PCT/JP2016/002806 filed on Jun. 10, 2016 and published in Japanese as WO 2016/203744 A1 on Dec. 22, 2016. This application is based on and claims the benefit of priority from Japanese Patent Application No. 2015-121431 filed on Jun. 16, 2015. The entire disclosures of all of the above applications are incorporated herein by reference.

TECHNICAL FIELD

The present disclosure relates to a positioning apparatus that receives navigation signals transmitted by navigation satellites and provides positioning using the received navigation signals.

BACKGROUND ART

A widely known type of satellite positioning system, such as a global positioning system (GPS), uses navigation satellites. Navigation satellites transmit navigation signals. A receiver receives the navigation signals, performs various types of calculation based on information contained in the received navigation signals, and provides positioning, in other words, determines a current position.

While a satellite positioning system may be used to determine the coordinates of a fixed point, it is also widely used to provide positioning for a movable object, such as a vehicle.

Inertial navigation is also widely known as a positioning technology for a movable object. The inertial navigation uses signals from inertial sensors, such as an acceleration sensor and a gyro sensor, to sequentially update the current position.

A positioning apparatus is known that combines the navigation-signal-based positioning with the inertial navigation for sequentially determining the current position (for example, Patent Literature 1). Specifically, such a system performs positioning using navigation signals periodically. The system also calculates a movement quantity based on the inertial navigation sequentially in a time period from when coordinates based on the navigation signals (hereinafter referred to as satellite positioning coordinates) are determined until when the following satellite positioning coordinates are determined. The current position is determined sequentially by adding the movement quantity to the latest satellite positioning coordinates.

The satellite positioning coordinates may be degraded in accuracy due to a signal reception environment in which the navigation signals are received, such as multipath. Using such less accurate satellite positioning coordinates as a reference point to which the movement quantity, which is calculated based on the inertial navigation, is added to determine the current position results in a stepwise path of the current position, despite the fact that the actual path of the movable object is continuous.

PRIOR ART LITERATURES

Patent Literature

Patent Literature 1: JP 3848712 B2

SUMMARY OF INVENTION

An object of the present disclosure is to provide a positioning apparatus that enables inhibition of a stepwise change in the path of the position of a movable object when satellite positioning coordinates are degraded in accuracy.

According to an aspect of the present disclosure, a positioning apparatus is used with a movable object to determine a position of the movable object sequentially. The positioning apparatus includes: a satellite positioning device that calculates a satellite positioning coordinate, which is determined based on a navigation signal received by a navigation signal receiver; a movement quantity calculator that acquires a signal detected by an inertial sensor and sequentially calculates a movement quantity of the movable object by inertial navigation from a moment when the navigation signal is received until a moment when the signal from the inertial sensor is received; a virtual reference point determinator that sequentially determines a coordinate of a virtual reference point at and after the moment when the navigation signal is received; and a position determinator that determines the position of the movable object sequentially based on the movement quantity of the movable object from the virtual reference point. The virtual reference point determinator determines that the coordinate of the virtual reference point is obtained by multiplying respective weighting factors on the position of the movable object, which is determined when the navigation signal is received, and the satellite positioning coordinate, and increases one of the respective weighting factors to be used to multiply the satellite positioning coordinate in incremental steps.

Thus, increasing the weighting factor used to multiply the satellite positioning coordinates in incremental steps brings the virtual reference point closer to the satellite positioning coordinates gradually, even if the accuracy of the satellite positioning coordinates is degraded. Since the virtual reference point is brought closer to the satellite positioning coordinates gradually, a stepwise change in the path of the position of a movable object determined based on the virtual reference point and the movement quantity calculated by the movement quantity calculator can be inhibited.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
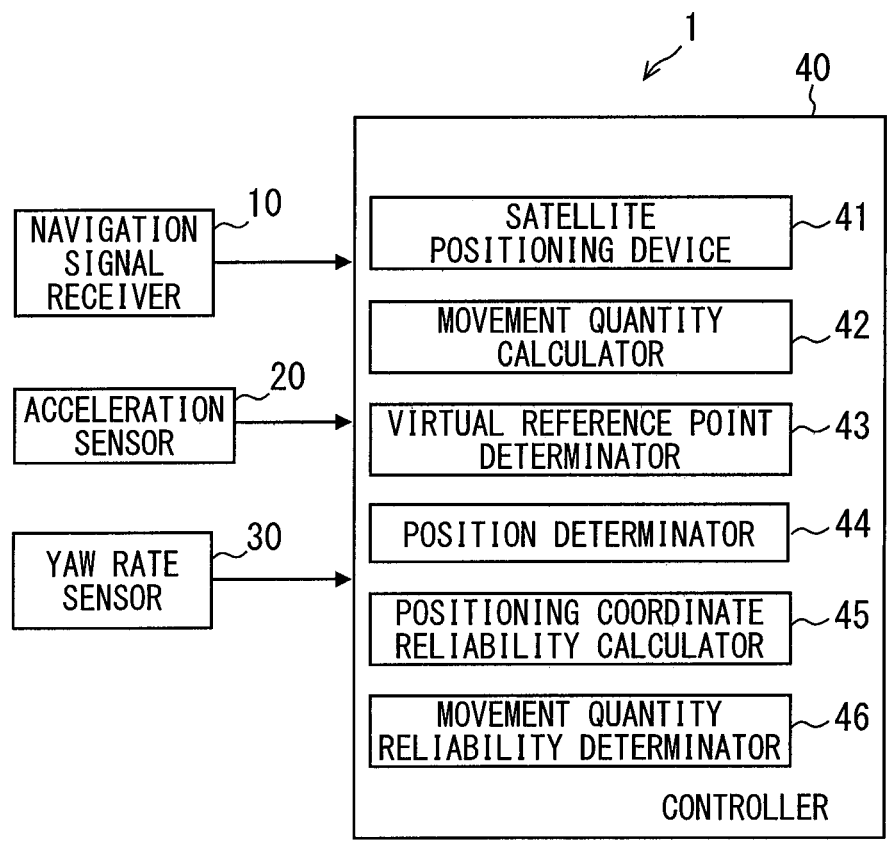
FIG. 1 is a configuration diagram of a positioning apparatus according to an embodiment.

An embodiment of the present disclosure will now be described with reference to the drawings. A positioning apparatus 1 illustrated in FIG. 1 includes a navigation signal receiver 10, an acceleration sensor 20, a yaw rate sensor 30, and a controller 40 and is mounted on a vehicle, which is a movable object. The vehicle is not illustrated. The vehicle in which the positioning apparatus 1 is mounted may be hereinafter referred to as a host vehicle.

<Outline of Configuration>

The navigation signal receiver 10 receives a GPS radio wave transmitted by a GPS satellite, which is a navigation satellite used by the GPS, which is a satellite positioning system. A GPS radio wave includes a carrier and a navigation signal superimposed on the carrier. The navigation signal receiver 10 demodulates the received GPS radio wave to extract a navigation signal and outputs the signal to the controller 40.

A navigation signal is output to the controller 40 in a certain cycle because code demodulation, among others, is required in order to extract a navigation signal from a GPS radio wave. The certain cycle takes, for example, a time period between 200 milliseconds and 400 milliseconds. The navigation signal receiver 10 also outputs the carrier, the received signal strength, and the reception time of the navigation signal, together with the navigation signal, to the controller 40.

As widely known, a plurality of GPS satellites are present. The navigation signal receiver 10 outputs all navigation signals extractable by demodulation of the GPS radio waves to the controller 40. A navigation signal includes a Satellite Catalog Number of a corresponding GPS satellite, an ephemeris, which provides information on the path of the GPS satellite, and the time when the GPS satellite has transmitted the corresponding radio wave.

The acceleration sensor 20 and the yaw rate sensor 30 are inertial sensors. The acceleration sensor 20 is a three-axis acceleration sensor with its orientation fixed in such a manner that the z axis is parallel with an up and down direction of a vehicle, the x axis is parallel with a width direction of the vehicle, and the y axis is parallel with a forward and rearward direction of the vehicle. An acceleration sensor that senses acceleration in two axes, namely in the x axis and the y axis, may be used in place of the three-axis acceleration sensor. The acceleration sensor 20 transmits a detected value of acceleration in each axis to the controller 40.

The yaw rate sensor 30 senses an angular velocity around a perpendicular axis of the vehicle and passing through the yaw rate sensor 30; that is, it senses a yaw rate of the vehicle. The yaw rate sensor 30 then supplies the detected yaw rate to the controller 40. The perpendicular axis of a vehicle is an axis that is perpendicular to a cabin floor of the vehicle; it is parallel with a vertical axis when the vehicle is on a horizontal ground.

The controller 40 is a computer that includes a CPU, a ROM, a RAM, and the like, which are not illustrated. The CPU executes a program stored in a real non-transitory recording medium, such as the ROM, while using a temporary memory function of the RAM. In this manner, the controller 40 functions as a satellite positioning device 41, a movement quantity calculator 42, a virtual reference point determinator 43, a position determinator 44, a positioning coordinate reliability calculator 45, and a movement quantity reliability determinator 46. When these functions are executed, a method that corresponds to the program stored in the real non-transitory recording medium is executed. The function of each portion will be described with reference to FIGS. 2 and 3.

<Processes Performed by the Controller 40>

Processes performed by the controller 40 will now be described. The controller 40 performs a process illustrated in FIG. 2 in parallel with a process illustrated in FIG. 3. For example, while performing the process in FIG. 2, the controller 40 processes an interruption to perform the process in FIG. 3. The process in FIG. 2 will be described first. The controller 40 performs the process illustrated in FIG. 2 periodically. The entire process illustrated in FIG. 2, that is, steps S2 to S12, corresponds to the satellite positioning device 41.

Figure 2:
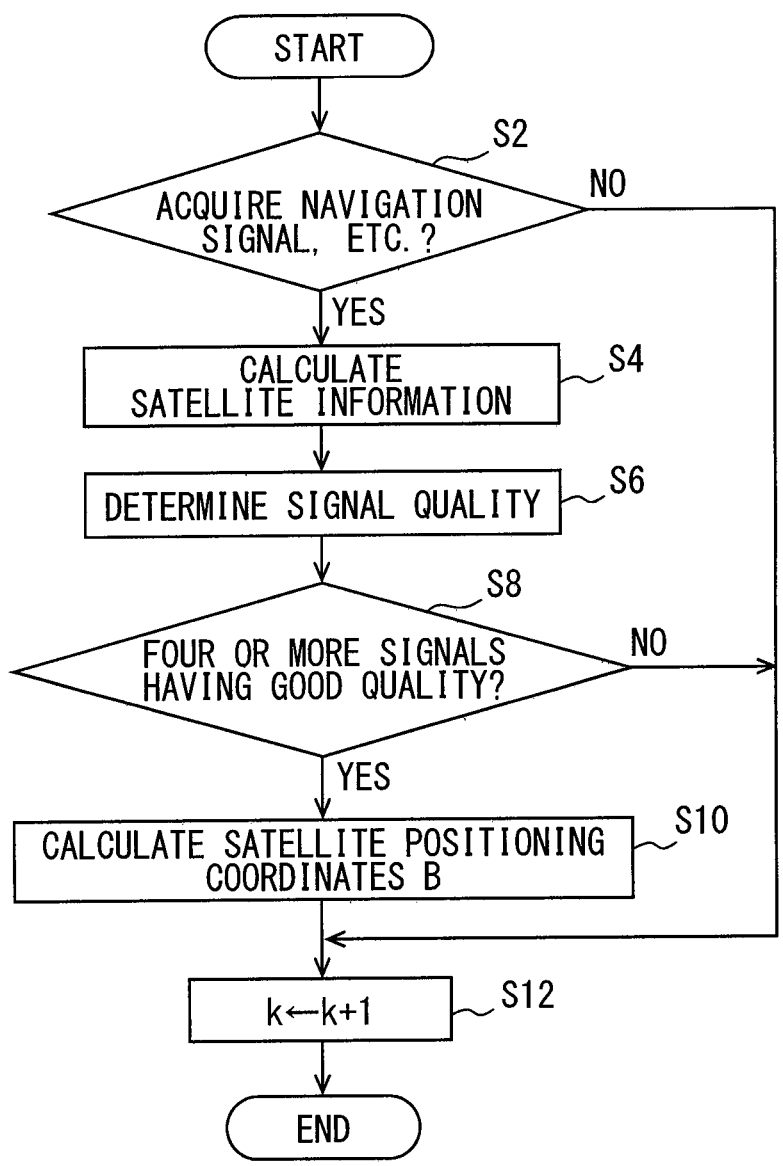
FIG. 2 is a flowchart illustrating a process to be performed by a controller in FIG. 1.

It is determined in step S2 whether a navigation signal, a corresponding carrier, the received signal strength, and the reception time of the navigation signal have been acquired from the navigation signal receiver 10. If NO is determined in step S2, the process in FIG. 2 is finished. If YES is determined in step S2, the process proceeds to step S4.

Information on a GPS satellite i including position coordinates ($X_{si}$, $Y_{si}$, $Z_{si}$) of the GPS satellite i, a pseudo range $\rho_i$, and a Doppler shift quantity $D_i$ is calculated in step S4 from the navigation signal and the carrier acquired from the navigation signal receiver 10. Here, i represents the Satellite Catalog Number of a GPS satellite.

The position coordinates ($X_{si}$, $Y_{si}$, $Z_{si}$) of each GPS satellite i are calculated based on its ephemeris and the transmission time of a corresponding GPS radio wave. The pseudo range $\rho_i$ is calculated by multiplying, by the speed of light, a time difference between the time at which the GPS satellite i has transmitted the GPS radio wave and the time at which the navigation signal receiver 10 has received the GPS radio wave, in other words, a radio wave propagation time period.

The GPS satellite i transmits GPS radio waves continuously, and the navigation signal receiver 10 receives the GPS radio waves continuously. The time at which the GPS satellite i has transmitted a GPS radio wave and the time at which the navigation signal receiver 10 has received the GPS radio wave represent the time at which the GPS satellite i has transmitted a predefined portion of the corresponding navigation signal, which is, for example, a first portion of the signal, and the time at which the navigation signal receiver 10 has received the predefined portion of the signal, respectively.

The Doppler shift quantity $D_i$ is a frequency difference between the frequency of a carrier in a radio wave transmitted by the GPS satellite i and the frequency of the carrier in the GPS radio wave received. The carrier frequency of a radio wave transmitted by a GPS satellite is defined in advance and is stored in advance in a predefined storage unit, such as a storage unit that is not illustrated and provided in the controller 40. Hence, in step S4, the Doppler shift quantity $D_i$ is calculated from the frequency of the carrier of the GPS radio wave that is acquired from the storage unit and the frequency of the carrier that is acquired from the navigation signal receiver 10. The frequency of the carrier acquired from the navigation signal receiver 10 is determined by a publicly known frequency analysis method; for example, a fast Fourier transform.

It is determined in step S6 whether the signal quality of the navigation signal is good. The determination of the signal quality is performed on all acquired navigation signals. The signal quality can be determined based on various publicly known criteria.

It is determined whether the signal quality is good based on, for example, S/N being equal to or greater than a predefined value (a determination condition 1), a residual of the pseudo range $\rho_i$ being equal to or less than a criterion distance (a determination condition 2), an angle of elevation $\theta_i$ being equal to or greater than a criterion angle (a determination condition 3), or a combination of the determination conditions 1 to 3 (a determination condition 4).

The residual of the pseudo range $\rho_i$ in the determination condition 2 is a difference between the distance from the position coordinates ($X_{si}$, $Y_{si}$, $Z_{si}$) of the GPS satellite i to satellite positioning coordinates B ($X_v$, $Y_v$, $Z_v$) of the host vehicle and the pseudo range $\rho_i$. The satellite positioning coordinates B ($X_v$, $Y_v$, $Z_v$) of the host vehicle are needed to calculate the residual. The satellite positioning coordinates B of the host vehicle are calculated by the same method used for calculating the satellite positioning coordinates B in step S10 to be described hereinafter. Hence, to calculate the residual of the pseudo range $\rho_i$, the satellite positioning coordinates B are calculated first.

If the residual of the pseudo range $\rho_i$ is greater than the criterion distance, an effect of multipath or the like is likely to be involved; thus, in this case, it is determined that the signal quality is not good. In the case of the determination condition 1, it is determined that the signal quality is good if S/N is equal to or greater than the predefined value. In the case of the determination condition 3, it is determined that the signal quality is good if the angle of elevation $\theta_i$ is equal to or greater than the criterion angle.

It is determined in step S8 whether the number of navigation signals whose signal quality is determined to be good in step S6 is four or greater. If the number is four or greater, the process proceeds to step S10.

The current satellite positioning coordinates ($X_v$, $Y_v$, $Z_v$) of the host vehicle are calculated in step S10 from the pseudo range $\rho_i$ and the position coordinates ($X_{si}$, $Y_{si}$, $Z_{si}$) of the GPS satellite i calculated in step S4. The coordinates calculated here are referred to as the satellite positioning coordinates B.

The satellite positioning coordinates B are calculated in a manner described below. A true distance $r_i$ to the GPS satellite i is expressed in an expression (1). The pseudo range $\rho_i$ is expressed in an expression (2). In the expression (2), s represents a distance error due to a clock error.

[Expression 1]

$$r_i = \sqrt{(X_{si} - X_v)^2 + (Y_{si} - Y_v)^2 + (Z_{si} - Z_v)^2} \quad (1)$$

[Expression 2]

$$\rho_i = r_i + s \quad (2)$$

By solving simultaneous equations described below in an expression (3) based on the pseudo range $\rho_i$ of four or more GPS satellites obtained from the expressions (1) and (2), the satellite positioning coordinates B ($X_v$, $Y_v$, $Z_v$) can be calculated.

[Expression 3]

$$\begin{cases} \rho_1 = \sqrt{(X_{s1} - X_v)^2 + (Y_{s1} - Y_v)^2 + (Z_{s1} - Z_v)^2} + s \\ \rho_2 = \sqrt{(X_{x2} - X_v)^2 + (Y_{s2} - Y_v)^2 + (Z_{s2} - Z_v)^2} + s \\ \vdots \\ \rho_N = \sqrt{(X_{sN} - X_v)^2 + (Y_{sN} - Y_v)^2 + (Z_{sN} - Z_v)^2} + s \end{cases} \quad (3)$$

Subsequently, one is added to k in step S12. The initial value of k is zero. Here, k represents the number of times the satellite positioning coordinates B are calculated.

Figure 3:
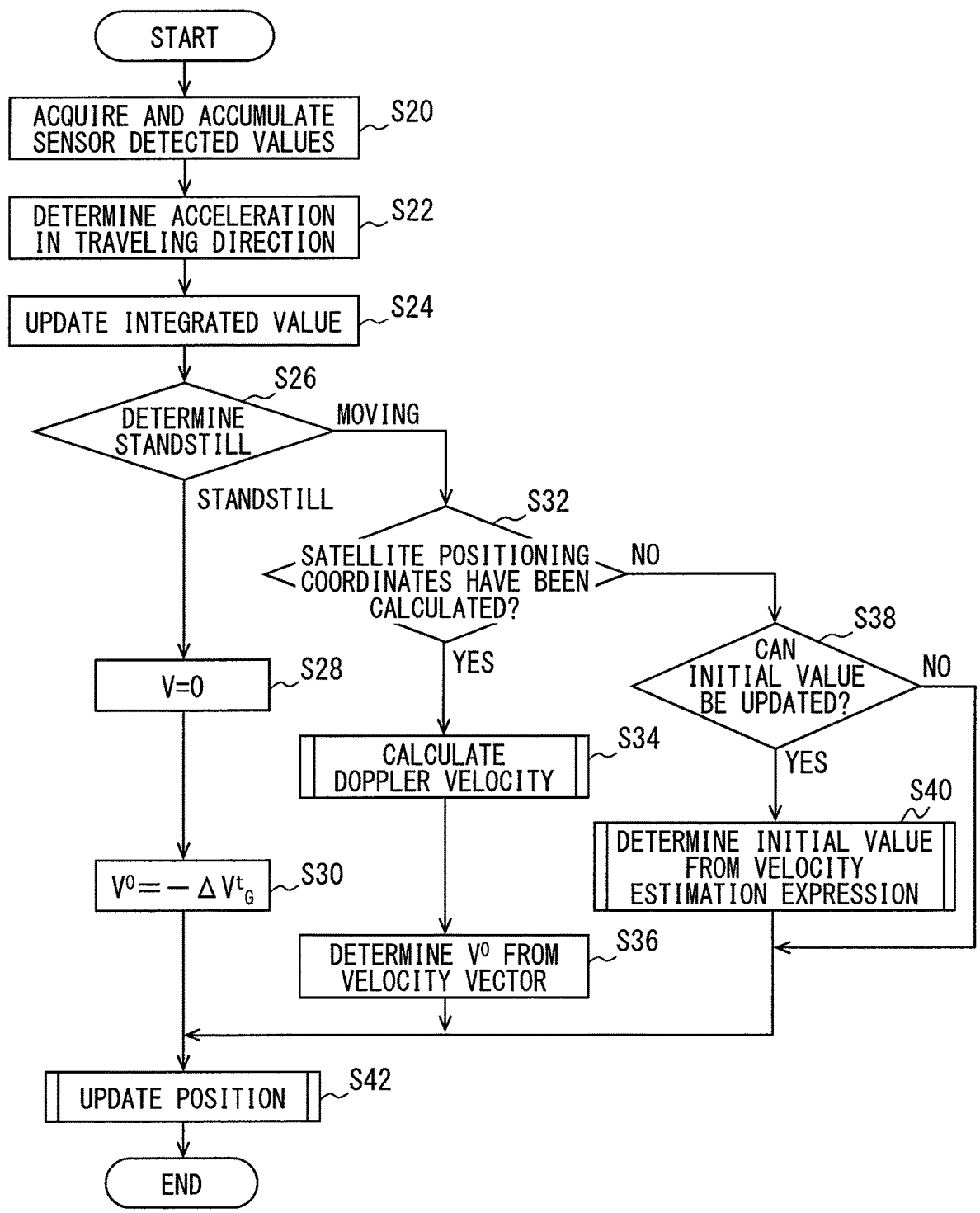
FIG. 3 is a flowchart illustrating a process to be performed by the controller in FIG. 1 in parallel with the process in FIG. 2.

FIG. 3 will now be described. A flowchart described in FIG. 3 is repeated in a cycle in which sensor values are acquired. The cycle in which the sensor values are acquired is shorter than that in which the navigation signal receiver 10 outputs a navigation signal and takes, for example, several tens of milliseconds. Each parameter represents a value at the latest time unless otherwise specified. The latest time is expressed as t=0. Time expressed with a negative number represents past time.

Detected values from the acceleration sensor 20 and the yaw rate sensor 30 are acquired in step S20 and stored in a storage device, such as the RAM. Acceleration in a traveling direction of the vehicle is determined in step S22 from a detected value of the acceleration sensor 20 acquired in step S20. As described above, the orientation of the acceleration sensor 20 with respect to the vehicle is fixed in the predefined manner, in which the y axis is in the traveling direction of the vehicle. Thus, the detected value of the acceleration sensor 20 in the y axis is extracted as the acceleration in the traveling direction.

A relative azimuth $\theta^t_{gyro}$ is updated in step S24 by adding to a previous relative azimuth $\theta^{t(-1)}_{gyro}$ a relative azimuth change quantity that is obtained from the detected value of the yaw rate sensor 30 acquired in step S20. The relative azimuth $\theta^t_{gyro}$ is a relative azimuth at a time t with respect to a traveling azimuth orientation of the vehicle at a reference time point. Additionally in step S24, the acceleration in the traveling direction determined in step S22 is added to a previous acceleration integrated value $\Delta V^{t(-1)}_G$ to also update an acceleration integrated value $\Delta V^t_G$.

It is determined in step S26 whether the host vehicle is at a standstill. This determination uses the detected value of the acceleration sensor 20 in the z axis acquired in step S20 in the present embodiment. If the detected value of the acceleration sensor 20 in the z axis is equal to or less than a standstill criterion value, it is determined that the vehicle is at a standstill. While traveling, a vehicle exhibits some up and down vibration; thus, the detected value in the z axis enables the determination of the standstill. In place of the detected value in the z axis, the detected value in the y axis, a change quantity of a detected value in the z axis, or a change quantity of a detected value in the y axis may be used. If a standstill is determined, the process proceeds to step S28.

A velocity vector is established at (0, 0, 0) in step S28. A velocity V is of course also zero.

A velocity initial value $V^0$ is set in step S30 to the latest acceleration integrated value $-\Delta V^t_G$. When step S30 has been performed, a position update process is performed in step S42. The position update process in step S42 will be described hereinafter.

If it is determined that the host vehicle is moving in step S26, the process proceeds to step S32. It is determined in step S32 whether the satellite positioning coordinates B have been calculated in a time period from when step S32 is performed last time until when step S32 is performed this time.

The satellite positioning coordinates B have been calculated in step S10. Note that it is necessary to acquire a navigation signal to calculate the satellite positioning coordinates B and that the cycle in which a navigation signal is acquired is longer than that in which the sensor values are acquired. In addition, note that, even if a navigation signal has been acquired, the satellite positioning coordinates B are not calculated unless four or more navigation signals of good quality have been acquired. Calculation is also needed after the acquisition of sufficient navigation signals, and the calculation takes time. Hence, NO may be determined in step S32.

If YES is determined in step S32, the process proceeds to step S34. A Doppler velocity is calculated in step S34. The Doppler velocity represents a velocity vector (Vx, Vy, Vz) of the host vehicle or the magnitude of the velocity vector. The velocity vector (Vx, Vy, Vz) is calculated using a Doppler shift quantity D and thus is referred to as the Doppler velocity herein.

Figure 4:
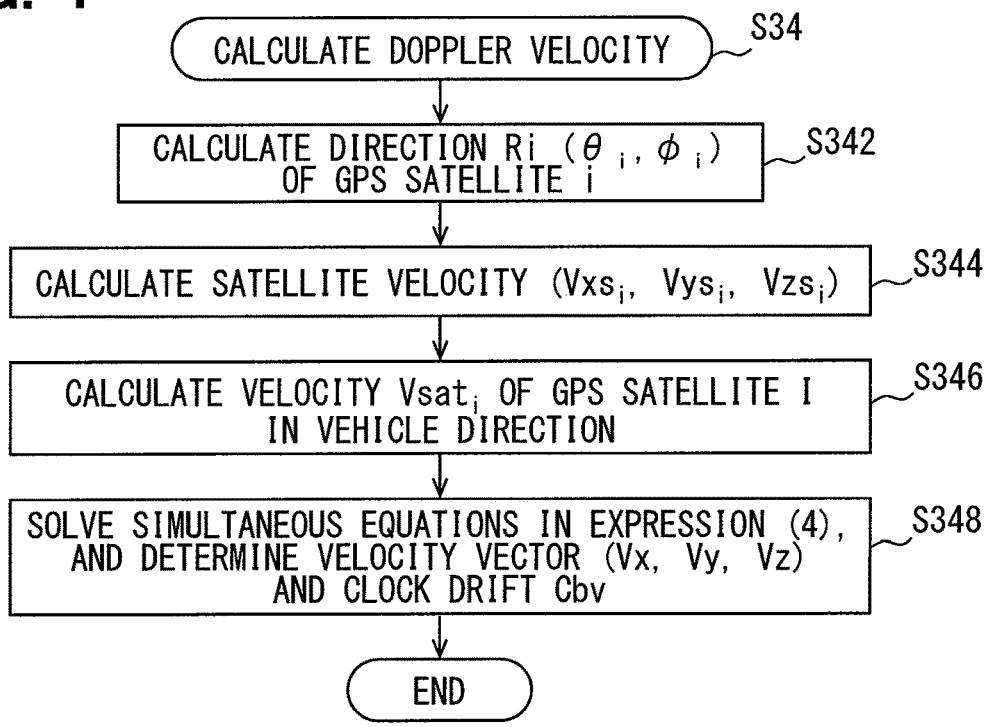
FIG. 4 is a flowchart illustrating in detail a process to calculate a Doppler velocity in FIG. 3.

The process in step S34 is described in detail in FIG. 4. With reference to FIG. 4, a direction $R_i$ ($\theta_i$, $\phi_i$) of each GPS satellite i is calculated in step S342 from the satellite positioning coordinates B ($X_v$, $Y_v$, $Z_v$) calculated in step S10 and the position coordinates ($X_{si}$, $Y_{si}$, $Z_{si}$) of each GPS satellite i calculated in step S4. The direction $R_i$ of each GPS satellite i is expressed with the angle of elevation $\theta_i$ with respect to a horizontal direction and the azimuth $\phi_i$ with respect to a north direction when each GPS satellite i is viewed from the host vehicle.

The velocity vector ($Vxs_i$, $Vys_i$, $Vzs_i$) of each GPS satellite i is calculated in step S344, by a publicly known method in which differentiation of Kepler's equation is used, from time-series data of the position coordinates ($X_{si}$, $Y_{si}$, $Z_{si}$) of each GPS satellite i calculated in step S4.

A velocity $Vsat_i$ of each GPS satellite i in a host vehicle direction is obtained in step S346 from the direction $R_i$ of each GPS satellite i calculated in step S342 and the velocity vector ($Vxs_i$, $Vys_i$, $Vzs_i$) of each GPS satellite i calculated in step S344 on the basis of $Vsat_i = R_i[Vxs_i, Vys_i, Vzs_i]^T$. Here, T represents transposition of the matrix.

Four or more simultaneous equations as indicated in an expression (4) are formed and solved in step S348. In this manner, the velocity vector (Vx, Vy, Vz) of the vehicle and a clock drift $Cbv^t$ of a clock included in the navigation signal receiver 10 can be obtained.

[Expression 4]

$$\begin{pmatrix} Vsat_0 + D_0 \cdot C/F \\ Vsat_1 + D_1 \cdot C/F \\ \vdots \\ Vsat_i + D_i \cdot C/F \end{pmatrix} = \begin{pmatrix} -\cos\theta_0 \sin\phi_0 & \cos\theta_0 \cos\phi_0 & \sin\theta_0 & -1 \\ -\cos\theta_1 \sin\phi_1 & \cos\theta_1 \cos\phi_1 & \sin\theta_1 & -1 \\ \vdots & \vdots & \vdots & \vdots \\ -\cos\theta_i \sin\phi_i & \cos\theta_i \cos\phi_i & \sin\theta_i & -1 \end{pmatrix} \cdot \begin{pmatrix} Vx \\ Vy \\ Vz \\ Cbv \end{pmatrix} \quad (4)$$

The expression (4) will now be described. A relationship between a satellite direction velocity $Vs_i$ and the velocity vector (Vx, Vy, Vz) of the host vehicle is expressed in an expression (5) below.

[Expression 5]

$$-Vx \cdot \cos\theta_i \sin\phi_i + Vy \cdot \cos\theta_i \cos\phi_i + Vz \cdot \sin\theta_i = Vs_i \quad (5)$$

A relative velocity $Vr_i$ of the vehicle with respect to the GPS satellite i satisfies an expression (6) described below.

[Expression 6]

$$Vr_i = -D_i \cdot C/F = Vsat_i - Vs_i + vCb \quad (6)$$

In the expression (6), $Vr_i$ represents the relative velocity of the vehicle with respect to the GPS satellite i, $D_i$ represents the Doppler shift quantity, C represents the speed of light, and F represents a frequency of a carrier of a radio wave transmitted by the GPS satellite.

An expression (7) can be derived from the expression (6).

[Expression 7]

$$Vs_i - vCb = Vsat_i + D_i \cdot C/F \quad (7)$$

By substitution of the left-hand side of the expression (5) in $Vs_i$ of the expression (7) for each GPS satellite i, simultaneous equations expressed in the expression (4) are obtained with the velocity vector (Vx, Vy, Vz) of the vehicle and Cbv as unknowns.

When radio waves are received from four or more GPS satellites, the simultaneous equations in the expression (4) can be solved. Here, any received GPS radio waves whose signal quality has been determined to be not good are excluded. Hence, if it is determined in step S8 that GPS radio waves including navigation signals whose signal quality is determined to be good are received from four or more GPS satellites, the velocity vector of the host vehicle is calculated from the expression (4).

With reference back to FIG. 3, the velocity initial value $V^0$ is determined in step S36 from an expression (8) on the basis of the velocity vector (Vx, Vy, Vz) of the host vehicle calculated in step S348 and the latest acceleration integrated value $\Delta V_G$ updated in step S24.

[Expression 8]

$$V^0 = \sqrt{Vx^2 + Vy^2 + Vz^2} - \Delta V_G \quad (8)$$

When step S36 has been performed, the position update process is also performed in step S42. Before describing step S42, step S38 and beyond will be described.

If it is determined in step S32 that the satellite positioning coordinates B are not calculated, the process proceeds to step S38. It is determined in step S38 whether the initial value can be updated. Specifically, it is determined whether four or more of a velocity estimation expression indicated in an expression (9) can be formed using navigation signals obtained since the velocity initial value $V^0$ has been updated.

[Expression 9]

$$Vs^t_i = (V^0 + \Delta V^t_G) Gx^t_i \cos(\theta^0 + \theta^t_{gyro}) + (V^0 + \Delta V^t_G) Gy^t_i \sin(\theta^0 + \theta^t_{gyro}) - CBv^0 - At \quad (9)$$

In the expression (9), t represents a time; $V_0$ represents the velocity initial value, which is a vehicle velocity at the initial time; $\Delta V_G$ represents an acceleration integrated value on and after the initial time; $\theta_0$ represents an azimuth at the initial time in a vehicle traveling direction (hereinafter referred to as the azimuth initial value); $\theta_{gyro}$ represents an integrated value of the azimuth in the vehicle traveling direction, that is, a relative azimuth; $Cbv^0$ represents a clock drift at the initial time; A represents a gradient of changes over time in clock drift; and Gx and Gy represent an x component and a y component, respectively, of a line-of-sight vector from the vehicle to the GPS satellite i. The expression (9) will now be described.

In the present embodiment, the velocity of the host vehicle can be also calculated in step S34 described above. To calculate the velocity vector (Vx, Vy, Vz) of the host vehicle in step S34, the satellite positioning coordinates B are needed. Hence, the velocity vector (Vx, Vy, Vz) of the host vehicle cannot be calculated if GPS radio waves of good signal quality are not received from four or more GPS satellites.

A time period in which the velocity vector (Vx, Vy, Vz) cannot be calculated may be prolonged in, for example, an urban area bristling with high-rise buildings. YES is determined in step S32 only in a certain cycle of 200 milliseconds to 400 milliseconds even in an environment where four or more GPS radio waves of good signal quality can be received. Hence, the velocity vector (Vx, Vy, Vz) of the vehicle can be calculated only in a cycle in which YES is determined in step S32.

In contrast, the detected values of the acceleration sensor 20 can be acquired independently of a traveling environment in a certain cycle of, for example, 20 ms that is shorter than that in which the velocity vector (Vx, Vy, Vz) can be calculated.

Thus, the velocity is estimated based on the acceleration integrated value $\Delta V_G$ in a time period from when the velocity vector (Vx, Vy, Vz) of the host vehicle is calculated until when the velocity vector (Vx, Vy, Vz) of the host vehicle is calculated next time.

The detected values of the acceleration sensor 20 always have errors, which, as widely known, have a propensity to diverge. Use of the acceleration integrated value $\Delta V_G$ as the velocity results in divergence of the errors with the passage of time. Thus, a highly accurate velocity is established as the velocity initial value $V^0$ at a point in time when the highly accurate velocity is obtained.

A value resulting from subtracting from the highly accurate velocity an acceleration integrated value $\Delta V_G$ that is obtained at the point in time when the highly accurate velocity is obtained is established as a velocity initial value $V^0$. The velocity initial value $V^0$ that is obtained in this manner represents an offset for establishing the acceleration integrated value $\Delta V_G$ as a highly accurate velocity that is regarded as a true velocity. Hence, an estimated velocity $V_e$ is obtained by $\Delta V_G - V^0$.

An error of the acceleration integrated value $\Delta V_G$ from the true velocity increases with the passage of time. Thus, the accuracy with which the velocity is estimated using the acceleration integrated value $\Delta V_G$ improves when a shorter cycle is used in which the velocity initial value $V^0$ is updated.

In the present embodiment, the expression (9) is used to update the velocity initial value $V^0$. The expression (9) results from improvement made to an expression (10) described below, which is disclosed in JP 2013-113789 A as an equation to calculate a final velocity vector. The velocity initial value $V^0$ and the azimuth initial value $\theta^0$ can be calculated simultaneously using the expression (9).

[Expression 10]

$$Vs^t_i = V^t_{wheel} Gx^t_i \cos(\theta^0 + \theta^t_{gyro}) + V^t_{wheel} Gy^t_i \sin(\theta^0 + \theta^t_{gyro}) - Cbv^0 - At \quad (10)$$

In the expression (10), $V_{wheel}$ is a detected value from a wheel velocity sensor. As comprehensible from comparison between the expressions (9) and (10), the expression (9) is obtained by replacing the detected value $V_{wheel}$ of the wheel velocity sensor in the expression (10) with the sum of the velocity initial value $V^0$ and the acceleration integrated value $\Delta V_G$.

Figure 5:
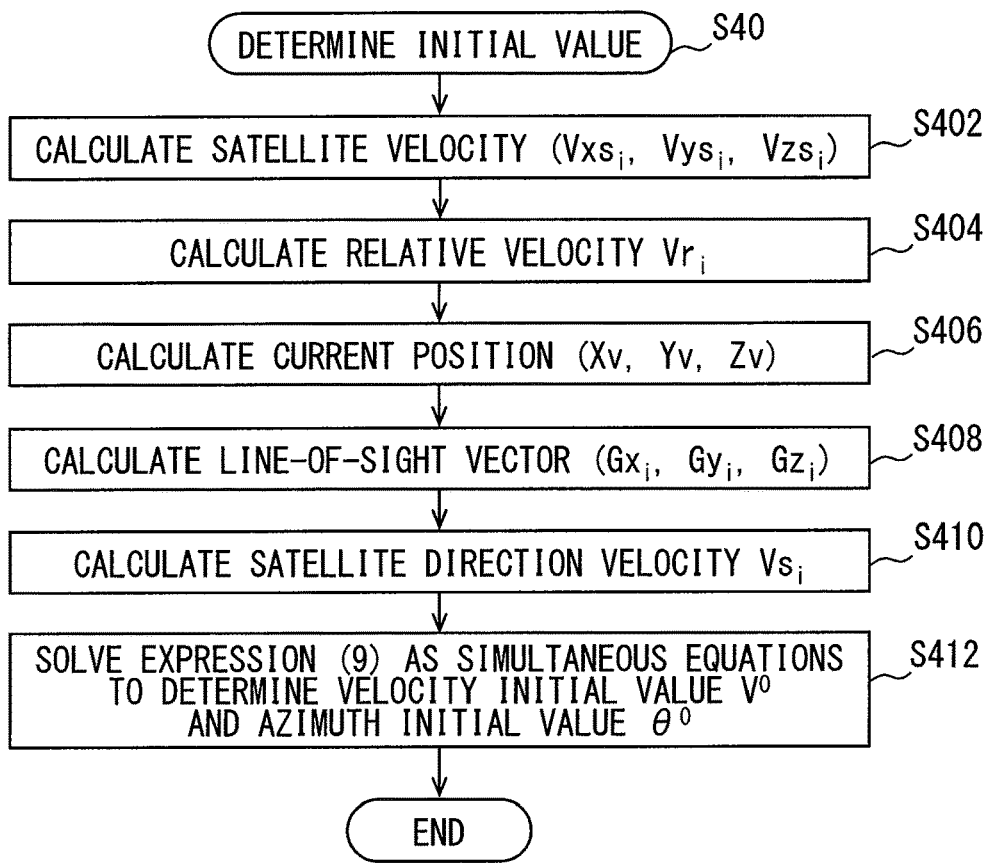
FIG. 5 is a flowchart illustrating in detail a process to determine an initial value in FIG. 3.

In step S40 where the expression (9) is used, a process specifically described in FIG. 5 is performed. With reference to FIG. 5, the velocity vector (Vxs$_i$, Vys$_i$, Vzs$_i$) of each GPS satellite i is calculated in step S402 from the time-series data of the position coordinates (X$_{si}$, Y$_{si}$, Z$_{si}$) of each GPS satellite i calculated in step S4.

The relative velocity Vr$_i$ of the host vehicle with respect to the GPS satellite i is calculated in step S404 by substitution of the Doppler shift quantity D$_i$ calculated in S4 in an expression (11).

[Expression 11]

$$Vr_i = -D_i \cdot C/F \quad (11)$$

A current position P (X$_v$, Y$_v$, Z$_v$) of the host vehicle is calculated in step S406. When step S406 is performed, four or more navigation signals of good signal quality are not received since No has been determined in step S32. The position P (X$_v$, Y$_v$, Z$_v$) calculated in step S406 is for use in calculation of a line-of-sight vector (Gx$_i$, Gy$_i$, Gz$_i$) from the host vehicle to the GPS satellite i in step S408 that follows.

Since the GPS satellite i is present in a distant place, the accuracy of the current position to be used to obtain the angle between the GPS satellite i and the host vehicle may be lower. Thus, there does not have to be four or more signals of good quality.

For example, the current satellite positioning coordinates B of the host vehicle is calculated in step S406 in a similar manner as in step S10 by using four or more navigation signals including those whose quality has been determined to be not good and the satellite positioning coordinates B thus calculated is established as the current position P (X$_v$, Y$_v$, Z$_v$) of the host vehicle.

Alternatively, the position P (X$_v$, Y$_v$, Z$_v$) of the host vehicle may be determined using a position determining method of lower accuracy that does not involve the pseudo range ρ$_i$. While dependent on the estimation accuracy tolerable by the system or the like, an error in the position of the host vehicle in the range of a few hundred meters results in an error in the estimated velocity of 1 m/sec or less, which poses no significant problem. Hence, the position P (X$_v$, Y$_v$, Z$_v$) of the host vehicle may be determined based on, for example, a map or the like, or from information such as a measurement history of the past positions or a beacon.

Alternatively, since low accuracy is acceptable, the position P of the host vehicle updated last time in the position update process (S42) to be described hereinafter may be established as the position P (X$_v$, Y$_v$, Z$_v$) of the host vehicle here.

The line-of-sight vector (Gx$_i$, Gy$_i$, Gz$_i$) from the host vehicle to the GPS satellite i is calculated in step S408. The x, y, and z components of the line-of-sight vector are calculated from an expression (12).

[Expression 12]

$$Gx^t_i = \frac{1}{\rho^t_i}(X^t_{si} - X^t_v), \; Gy^t_i = \frac{1}{\rho^t_i}(Y^t_{si} - Y^t_v), \; Gz^t_i = \frac{1}{\rho^t_i}(Z^t_{si} - Z^t_v) \quad (12)$$

In the expression (12), $\rho^t_i$ represents a pseudo range of the GPS satellite i at time t, and (X$^t_{si}$, Y$^t_{si}$, Z$^t_{si}$) represent the position coordinates of the GPS satellite i at the time t. They have been calculated in step S4. Alternatively, they may be calculated in step S408 in a method similar to that in step S4. The current position of the host vehicle at the time t is represented by (X$^t_v$, Y$^t_v$, Z$^t_v$), which are calculated in step S406.

The satellite direction velocity Vs$_i$ of the vehicle in the direction of the GPS satellite i is calculated in step S410 by substitution of the relative velocity Vr$_i$ calculated in step S404, the line-of-sight vector (Gx$_i$, Gy$_i$, Gz$_i$) calculated in step S408, and the velocity vector ($Vxs_i$, $Vys_i$, $Vzs_i$) of the GPS satellite i calculated in step S402 in an expression (13).

[Expression 13]

$$Vs_i^t = \frac{D_i^t}{f}C + Gx_i^t Vxs_i^t + Gy_i^t Vys_i^t + Gz_i^t Vzs_i^t \tag{13}$$

In the expression (13), the first term of the right-hand side represents the relative velocity $Vr_i$ of the vehicle with respect to the GPS satellite i, and the second to fourth terms represent the velocity of the GPS satellite i in the host vehicle direction. The sum of them represents the velocity of the vehicle in the direction of the GPS satellite i; thus, the expression (13) is satisfied.

The satellite direction velocity $Vs_i$ calculated in step S410, the acceleration integrated value $\Delta V_G$ updated in step S24, the relative azimuth $\theta_{gyro}$, and the line-of-sight vector ($Gx_i$, $Gy_i$, $Gz_i$) calculated in step S408 are substituted in the expression (9) in step S412. In this manner, the expression (9) has four unknown parameters, namely, $\theta^0$, $Cbv^0$, A, and $V^0$.

Thus, four or more of an expression obtained by substitution of the satellite direction velocity $Vs_i$, the acceleration integrated value $\Delta V_G$, the relative azimuth $\theta_{gyro}$, and the line-of-sight vector ($Gx_i$, $Gy_i$, $Gz_i$) in the expression (9) are formed. Then, simultaneous equations that include these four or more expressions are solved. In this manner, the velocity initial value $V^0$ and the azimuth initial value $\theta^0$, which are the unknown parameters in the expression (9), can be obtained simultaneously.

Moreover, the unknown parameters $\theta^0$, $Cbv^0$, A, and $V^0$ are unchanged at any time after the initial time. Thus, there is no need to form the four expressions with data obtained at an identical time; the unknown parameters can be obtained when there are four or more expressions formed with data obtained at different times. For example, for example, even if the number of observed satellites is one each at four different times ($t_0$, $t_1$, $t_2$, $t_3$), the velocity initial value $V^0$ and the azimuth initial value $\theta^0$ can be obtained using data from the observed GPS satellite(s).

With reference back to FIG. 3, if any of steps S30, S36, and S40 is performed, the process proceeds to step S42. The position update process is performed in step S42. The position update process is described in detail in FIG. 6.

Figure 6:
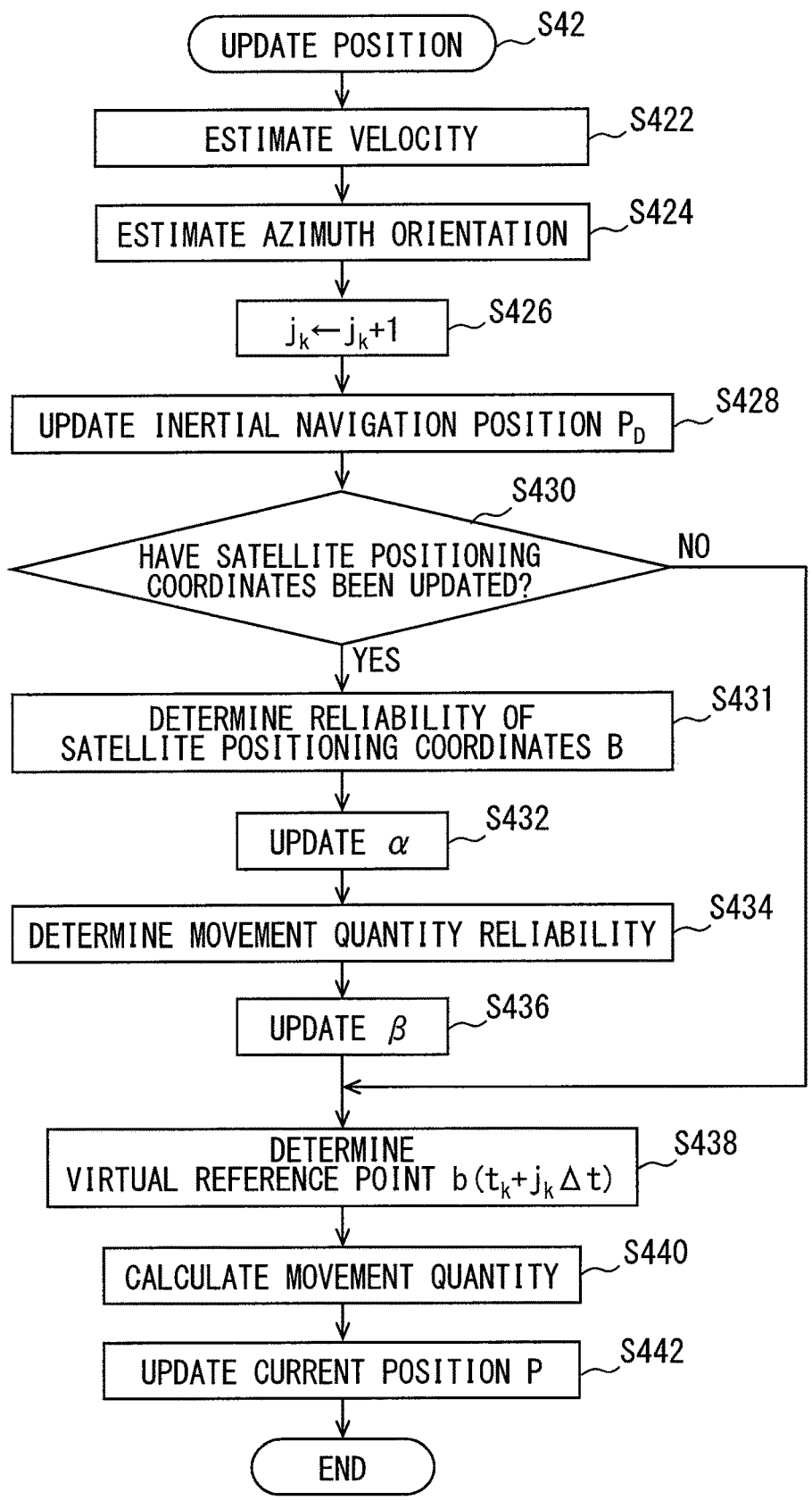
FIG. 6 is a flowchart illustrating in detail a process to update a position in FIG. 3.

With reference to FIG. 6, the estimated velocity $V_e$ is calculated in step S422 from the latest velocity initial value $V^0$ and the acceleration integrated value $\Delta V_G$ updated in step S24.

If the acceleration integrated value $\Delta V_G$ is not reset when the velocity initial value $V^0$ is updated, the estimated velocity $V_e$ is calculated by adding the velocity initial value $V^0$ to the acceleration integrated value $\Delta V_G$. If the acceleration integrated value $\Delta V_G$ is reset when the velocity initial value $V^0$ is updated, the estimated velocity $V_e$ is calculated by adding the acceleration integrated value $\Delta V_G$ to the velocity initial value $V^0$.

An estimated azimuth orientation $\theta_e$ is calculated in step S424 from the latest azimuth initial value $\theta^0$ and the relative azimuth $\theta_{gyro}$ updated in step S24. A specific method for calculating the estimated azimuth orientation $\theta_e$ is similar to the method in which the estimated velocity $V_e$ is calculated from the velocity initial value $V^0$ and the acceleration integrated value $\Delta V_G$ but with the velocity initial value $V^0$ replaced by the azimuth initial value $\theta^0$ and the acceleration integrated value $\Delta V_G$ replaced by the relative azimuth $\theta_{gyro}$.

In step S426, one is added to $j_k$ where $\alpha + j_k \beta$ is less than one. The initial value of $j_k$ is zero. As described in step S12, k increases by one every time the satellite positioning coordinates B are calculated. Thus, every time the satellite positioning coordinates B are calculated, new $j_k$ is generated. The initial value of $j_k$ is zero, and $j_k$ is zero at a time $t_k$. The time $t_k$ is the time at which a navigation signal used for the calculation of the satellite positioning coordinates $B(t_k)$ has been received. In addition, $j_k$ increases by one every time the process in FIG. 6 is performed. Hence, $j_k$ represents the number of times the process in FIG. 6 is performed on and after the time $t_k$. The meanings of $\alpha$ and $\beta$ will be described when steps S432 and S436 are described.

Subsequently, an inertial navigation position $P_D(t)$ is updated in step S428. The inertial navigation position $P_D(t)$ is updated by adding to an inertial navigation position $P_D(t-1)$ obtained last time a distance obtained by multiplying the estimated velocity $V_e$ calculated in step S422 performed this time by an updating cycle of the inertial navigation position $P_D$ in the direction of the estimated azimuth orientation $\theta_e$ calculated in step S424 performed this time.

It is determined in step S430 whether the satellite positioning coordinates B have been updated in a time period from when step S430 is performed last time until when step S430 is performed this time. If NO is determined in step S430, the process proceeds to step S438 without performing steps S431 to S436. If YES is determined in step S430, the process proceeds to step S431.

The reliability of the satellite positioning coordinates B is determined in step S431. The reliability of the satellite positioning coordinates B can be determined in various publicly known methods. The reliability of the satellite positioning coordinates B is determined based on, for example, predefined correspondence between the reliability and any one of (1) the number of navigation signals used for the calculation of the satellite positioning coordinates B, (2) S/N of a navigation signal, (3) a residual of the pseudo range $\rho_i$, and (4) the angle of elevation $\theta_i$ of the GPS satellite i or a combination of (1) to (4). Step S431 corresponds to the positioning coordinate reliability calculator 45.

An offset term $\alpha$ included in a virtual reference point calculating expression indicated in an expression (15) is updated in step S432. The expression (15) represents a virtual reference point derivation function F{P} indicated in an expression (14) in the present embodiment.

[Expression 14]

$$b(t_k + j_k \Delta t) = F(\{P\}, t_k + j_k \Delta t) \tag{14}$$

[Expression 15]

$$F\{P\} = (1 - \alpha - j_k \beta) P(t_k) + (\alpha + j_k \beta) B(t_k)$$

$$0 \leq 1 - \alpha - j_k \beta \leq 1,\ 0 \leq \alpha + j_k \beta \leq 1 \tag{15}$$

In the expressions (14) and (15), k at the time $t_k$ is an integer, and the time $t_k$ represents a point in time when the navigation signal used for the calculation of the satellite positioning coordinates B has been received.

In the expression (14), $\Delta t$ represents a cycle in which the position P of the host vehicle is updated by the inertial navigation. This cycle is referred to as an inertial navigation cycle hereinafter. The position P of the host vehicle can be updated every time the detected values of the acceleration sensor 20 and the yaw rate sensor 30 are acquired. Thus, the inertial navigation cycle is a cycle in which the detected values are acquired from the acceleration sensor 20 and the yaw rate sensor 30.

Since $\Delta t$ represents the inertial navigation cycle and $j_k$ represents the number of times the process in FIG. 6 is performed since the satellite positioning coordinates B have been updated, $j_k \Delta t$ represents an elapsed time period since the satellite positioning coordinates B have been updated until the present point in time.

The expression (14) represents the following: a virtual reference point $b(t_k+j_k\Delta t)$ at a time $t_k+j_k\Delta t$ represents the coordinates indicated by the virtual reference point derivation function F{P} at the time $t_k+j_k\Delta t$.

The expression (15) represents the following: the coordinates indicated by the virtual reference point derivation function F{P} at the time $t_k+j_k\Delta t$ represent a value obtained by adding the latest satellite positioning coordinates $B(t_k)$ at this point in time to the position $P(t_k)$ of the host vehicle determined at the time $t_k$ with each multiplied by a weighting factor.

Every time $j_k$, which is an integer equal to or greater than zero, increases, the value of $-j_k\beta$ decreases. Additionally in FIG. 6, a movement quantity $\Delta D$ of the host vehicle is calculated in step S440 to be described hereinafter. Hence, $-j_k\beta$ is a negative term whose value decreases in accordance with the number of times the movement quantity $\Delta D$ is calculated. Meanwhile, $j_k\beta$ is a positive term whose value increases in accordance with the number of times the movement quantity $\Delta D$ is calculated. Additionally, $(1-\alpha-j_k\beta)$ including $-j_k\beta$, which is the negative term, is defined as a first factor calculating expression, and $(\alpha+j_k\beta)$ including $j_k\beta$, which is the positive term, is defined as a second factor calculating expression.

In the virtual reference point calculating expression, $(1-\alpha-j_k\beta)$, which is used to multiply the position $P(t_k)$ of the host vehicle, and $(\alpha+j_k\beta)$, which is used to multiply the satellite positioning coordinates $B(t_k)$, represent the weighting factors. The virtual reference point $b(t_k+j_k\Delta t)$ on and after the time $t_k$ is in a position determined by the ratio defined by $(1-\alpha-j_k\beta)$ and $(\alpha+j_k\beta)$ between the position $P(t_k)$ of the host vehicle at the time $t_k$ and the satellite positioning coordinates $B(t_k)$ at the time $t_k$.

The virtual reference point $b(t_k+j_k\Delta t)$ is brought closer to the satellite positioning coordinates $B(t_k)$ as the number of times the movement quantity $\Delta D$ is calculated increases.

The offset term $\alpha$ is constant regardless of $j_k$ in the virtual reference point calculating expression. As the offset term $\alpha$ increases, the virtual reference point $b(t_k+j_k\Delta t)$ is brought closer to the satellite positioning coordinates $B(t_k)$, starting when $j_k=0$.

The virtual reference point $b(t_k+j_k\Delta t)$ is calculated in order to prevent a sudden and large change in the position of the host vehicle even when the accuracy of the satellite positioning coordinates $B(t_k)$ is degraded. Thus, as the satellite positioning coordinates $B(t_k)$ become more reliable, the virtual reference point $b(t_k+j_k\Delta t)$ may be brought closer to the satellite positioning coordinates $B(t_k)$.

Hence, the value of $\alpha$ is increased in step S432 in accordance with the reliability of the satellite positioning coordinates B. Specifically, with correspondence between the reliability of the satellite positioning coordinates B and $\alpha$ predefined, the value of $\alpha$ is updated based on the reliability determined this time and the correspondence. In the correspondence between the reliability of the satellite positioning coordinates B and $\alpha$, $\alpha$ increases stepwise or continuously as the reliability of the satellite positioning coordinates B increases.

Movement quantity reliability is determined in step S434. The movement quantity reliability represents the reliability of the movement quantity $\Delta D$ calculated in step S440 to be described hereinafter. As widely known, the inertial navigation integrate errors. In other words, errors increase as the position P of the host vehicle is updated by the inertial navigation for a longer time period. Hence, in step S434, the movement quantity reliability is reduced as the position P of the host vehicle is updated only by the inertial navigation without updating the satellite positioning coordinates B for a longer time period. The value $j_k$ that is updated in step S426 may be used as the time period over which the satellite positioning coordinates B is not updated. Step S434 corresponds to the movement quantity reliability determinator 46.

The value of $\beta$ is updated to be a smaller value in step S436 as the movement quantity reliability determined in step S434 increases. A reason for making such an update is described below.

As $\beta$ becomes larger, the virtual reference point $b(t_k+j_k\Delta t)$, which can be calculated with the virtual reference point calculating expression, agrees with the satellite positioning coordinates $B(t_k)$, with a smaller value of $j_k$. That is, $\beta$ specifies the number of the inertial navigation cycles taken for the virtual reference point $b(t_k+j_k\Delta t)$ to agree with the satellite positioning coordinates $B(t_k)$ after the satellite positioning coordinates $B(t_k)$ is obtained. This $\beta$ corresponds to a transition speed term.

As the movement quantity reliability increases, the need to quickly bring the virtual reference point $b(t_k+j_k\Delta t)$ closer to the satellite positioning coordinates $B(t_k)$ decreases. Hence, the value of $\beta$ is updated to be a larger value as the movement quantity reliability increases. In step S436, the value of $\beta$ that is to be obtained after the update is determined from a predefined relationship in which $\beta$ decreases stepwise or continuously as the movement quantity reliability increases and the movement quantity reliability determined in step S434.

The virtual reference point $b(t_k+j_k\Delta t)$ at the time $t_k+j_k\Delta t$ is calculated in step S438 by substitution of the position $P(t_k)$ of the host vehicle at the time $t_k$ and the satellite positioning coordinates $B(t_k)$ calculated from the navigation signal received at the time $t_k$ in the latest virtual reference point calculating expression. Steps S430, S432, S436, and S438 correspond to the virtual reference point determinator 43.

The movement quantity $\Delta D$ for which the host vehicle has traveled from the time $t_k$ to the current time $t_k+j_k\Delta t$ is calculated in step S440 from an expression (16). As comprehensible from the expression (16), the movement quantity $\Delta D$ is calculated using the inertial navigation position $P_D$ calculated in step S428. Note that step S440 and steps S20 to S40 in FIG. 3 correspond to the movement quantity calculator 42.

[Expression 16]

$$\Delta D = D(t_k+j_k\Delta t) - D(t_k) \quad (16)$$

The current position P of the host vehicle is updated in step S442 by using an expression (17). Step S442 corresponds to the position determinator 44.

[Expression 17]

$$P = \Delta D + b(t_k+j_k\Delta t) = D(t_k+j_k\Delta t) - D(t_k) + b(t_k+j_k\Delta t) \quad (17)$$

(Conclusion of the Embodiment)

The positioning apparatus 1 according to the present embodiment uses the obtained satellite positioning coordinates B to determine (in S438) the virtual reference point $b(t_k+j_k\Delta t)$ as a reference point that serves as a starting point for the movement quantity $\Delta D$, instead of using the satellite positioning coordinates B as they are as the reference point.

As indicated in the expression (15), the virtual reference point $b(t_k+j_k\Delta t)$ represents coordinates determined by multiplying the position $P(t_k)$ of the host vehicle at the time $t_k$ at which the navigation signal used for the calculation of the satellite positioning coordinates $B(t_k)$ has been received and the satellite positioning coordinates $B(t_k)$ by respective weighting factors and, then, adding them together. Additionally, the weighting factor $(\alpha+j_k\beta)$, which is used to multiply the satellite positioning coordinates $B(t_k)$, increases every time the position update process (FIG. 6) is performed.

Figure 7:
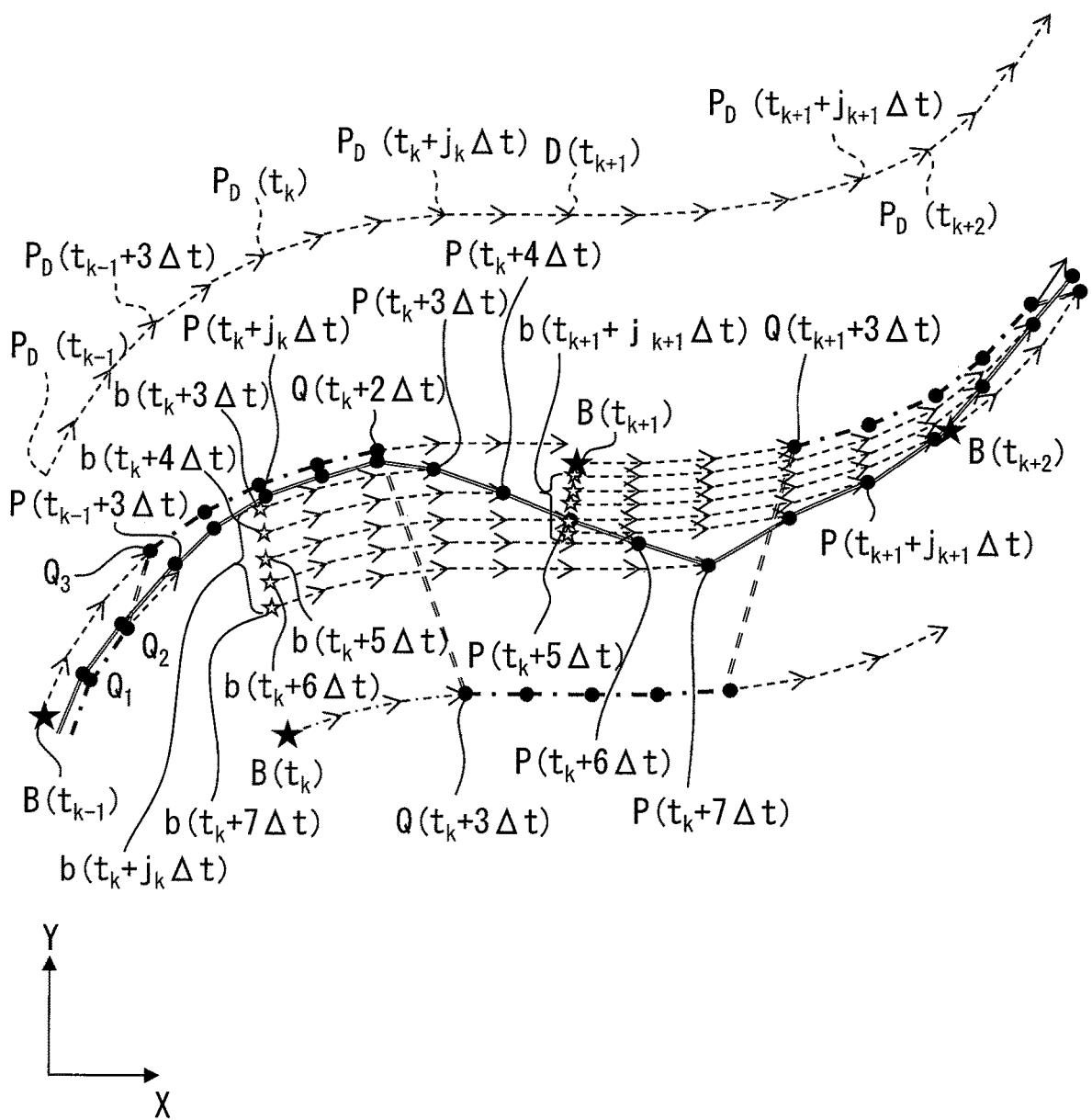
FIG. 7 is a diagram for describing a position of a host vehicle to be determined by the positioning apparatus according to the embodiment.

Since the weighting factor $(\alpha+j_k\beta)$, which is used to multiply the satellite positioning coordinates B, increases every time the position update process is performed, the virtual reference point $b(t_k+j_k\Delta t)$ is brought closer to the satellite positioning coordinates $B(t_k)$ every time $j_k$ increases, as illustrated in FIG. 7.

The satellite positioning coordinates $B(t_k)$ illustrated in FIG. 7 is an example of those of degraded positioning accuracy. In FIG. 7, a path indicated with a broken line represents an inertial navigation path; a path indicated with a double line represents a path of the position P of the host vehicle, which is updated sequentially in step S442. A dot and dash line represents a path of the position of the host vehicle updated using, instead of the virtual reference point b, the satellite positioning coordinates $B(t_k)$ as the reference point immediately after the satellite positioning coordinates $B(t_k)$ are calculated. This path is referred to as conventional method path hereinafter.

A calculation processing time period is required from when a navigation signal is received until when the satellite positioning coordinates B are obtained. In the example of FIG. 7, the calculation processing time period is $3\Delta t$. The satellite positioning coordinates $B(t_{k-1})$ illustrated in FIG. 7, for example, are not obtained until the position update process is performed the third time after navigation signals for the calculation of the satellite positioning coordinates $B(t_{k-1})$ are received. Thus, at points $Q_1$ and $Q_2$ in the conventional method path, the satellite positioning coordinates $B(t_{k-1})$ do not serve as the reference point.

The satellite positioning coordinates $B(t_{k-1})$ serve as the reference point at a point $Q_3$, which is obtained in the position update process performed the third time after the navigation signals for the calculation of the satellite positioning coordinates $B(t_{k-1})$ are received. The movement quantity from a point $D(t_{k-1})$ to a point $D(t_{k-1}+3\Delta t)$ in the inertial navigation path is added to this reference point to obtain the point $Q_3$.

Since the positioning accuracy of the satellite positioning coordinates $B(t_k)$ is degraded, a point $Q(t_k+3\Delta t)$, at which the satellite positioning coordinates $B(t_k)$ are used as the reference point, exhibits a drastic change in position from a point $Q(t_k+2\Delta t)$, which is immediately before the point $Q(t_k+3\Delta t)$, leaving a step-like shape in the conventional method path. When the satellite positioning coordinates $B(t_{k+1})$ are obtained next time, another stepwise change is made to the conventional method path at a point $Q(t_{k+1}+3\Delta t)$.

Conversely, in the present embodiment, instead of using the satellite positioning coordinates $B(t_k)$ as they are as the reference point, the virtual reference point $b(t_k+j_k\Delta t)$ is determined. The virtual reference point $b(t_k+j_k\Delta t)$, which is calculated with the expression (15), is located between the position $P(t_k)$ of the host vehicle and the satellite positioning coordinates $B(t_k)$ at the time $t_k$ at which the navigation signal used for the calculation of the satellite positioning coordinates $B(t_k)$ has been received. Moreover, the virtual reference point $b(t_k+j_k\Delta t)$ is brought closer to the satellite positioning coordinates $B(t_k)$ every time $j_k$ increases.

In the example of FIG. 7, at the time $t_k+3\Delta t$, $t_k+4\Delta t$, $t_k+5\Delta t$, $t_k+6\Delta t$, and $t_k+7\Delta t$, the positions of the host vehicle $P(t_k+3\Delta t)$, $P(t_k+4\Delta t)$, $P(t_k+5\Delta t)$, $P(t_k+6\Delta t)$, and $P(t_k+7\Delta t)$ are calculated using the virtual reference points $b(t_k+3\Delta t)$, $b(t_k+4\Delta t)$, $b(t_k+5\Delta t)$, $b(t_k+6\Delta t)$, and $b(t_k+7\Delta t)$, respectively. Accordingly, a stepwise change in the path of the position P of the host vehicle can be inhibited.

Additionally, in the present embodiment, the reliability of the satellite positioning coordinates B is determined (S431), and the offset term $\alpha$ is increased as the reliability increases (S432). In this manner, when the reliability of the satellite positioning coordinates B is higher, the virtual reference point b is brought closer to the satellite positioning coordinates B. Accordingly, the accuracy of the position P of the host vehicle is improved.

Furthermore, in the present embodiment, the movement quantity reliability is determined (S434). As the movement quantity reliability increases, $\beta$ is updated to be a smaller value (S436). By updating $\beta$ to a smaller value, the effect of degraded accuracy of satellite positioning coordinates B, if any, can be reduced.

While an embodiment of the present disclosure has been described, the present disclosure should not be construed as being limited to the embodiment. The technical scope of the present disclosure also includes modifications to be described below, and various other modifications are also possible within a scope not departing from the spirit of the present disclosure.

<First Modification>

While the value of the offset term $\alpha$ is determined in accordance with the reliability of the satellite positioning coordinates B in the embodiment described above, the value of the offset term $\alpha$ may be unchanged. In this case, no reliability of the satellite positioning coordinates B may be determined.

<Second Modification>

While the value of $\beta$ is updated in accordance with the movement quantity reliability in the embodiment described above, the value of $\beta$ may be unchanged. In this case, no movement quantity reliability may be determined.

<Third Modification>

No offset term $\alpha$ may be used in the virtual reference point calculating expression indicated in the expression (15).

<Fourth Modification>

While the movable object is a vehicle in the embodiment described above, the present disclosure is applicable to other movable objects.

<Fifth modification>

The satellite positioning coordinates B are calculated by solving the expression (3) in the embodiment described above. However, the calculating method in the embodiment described above is not limitative. The satellite positioning coordinates B may be calculated in any other method as long as they are calculated using a navigation signal.

For example, the satellite positioning coordinates B may be determined based on the combination of coordinates calculated using navigation signals received at different times and an inertial navigation path. Specifically, a movement quantity of a movable object obtained by the inertial navigation from the time at which a navigation signal is received one cycle earlier until the time at which the latest navigation signal is received is added to the coordinates calculated using the navigation signal received one cycle earlier. In this manner, the coordinates at the time at which the latest navigation signal is received are determined based on the navigation signal received one cycle earlier.

Furthermore, in a manner similar to that in which the coordinates at the time at which the latest navigation signal is received are obtained based on a navigation signal received one cycle earlier, the coordinates at the time at which the latest navigation signal is received may be obtained based on a navigation signal received two cycles earlier, or three or more cycles earlier. In this manner, one or more sets of the coordinates at the time at which the latest navigation signal is received is determined based on a past navigation signal. Then, the final satellite positioning coordinates B are obtained by performing averaging or the like on the coordinates at the time at which the latest navigation signal is received, which are obtained based on the past navigation signal, and the coordinates obtained from the latest navigation signal.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A positioning apparatus used with a movable object, the positioning apparatus comprising:
   a controller having a processor configured to:
   calculate satellite positioning coordinates based on at least four navigation signals received by a navigation signal receiver, the satellite positioning coordinates including a first satellite positioning coordinate calculated at a first time and a second satellite positioning coordinate calculated at a second time;
   acquire a signal detected by an inertial sensor;
   calculate movement quantities of the movable object based on the signal detected by the inertial sensor by inertial navigation, including a movement quantity calculated from the first time to the second time and movement quantities calculated at a plurality of predetermined times after the second time based on an inertial navigation cycle time;
   sequentially determine a plurality of virtual reference points, with each virtual reference point corresponding to one of the plurality of predetermined times, based on (i) a previous position of the moveable object weighted with a first weighting value, the previous position being calculated based on the first satellite positioning coordinate and the movement quantity of the moveable object calculated by inertial navigation from the first time to the second time, and (ii) the second satellite positioning coordinate weighted with a second weighting value, the second weighting value being sequentially increased over time so that the virtual reference point moves closer to the second satellite positioning coordinate over time; and
   sequentially determine a current position of the movable object at each of the plurality of predetermined times after the second time, the current position being determined based on (a) the corresponding virtual reference point from the plurality of virtual reference points that is associated with the corresponding predetermined time and (b) a current movement quantity of the moveable object calculated by inertial navigation from the second time to the corresponding predetermined time.

2. The positioning apparatus according to claim 1, wherein the controller is further configured to:
   calculate the first weighting value by decreasing the first weighting value over time based on a number of the movement quantities the controller has calculated after the second time; and
   calculate the second weighting value by increasing the second weighting value based on the number of movement quantities the controller has calculated after the second time.

3. The positioning apparatus according to claim 2, wherein each of the first weighting value and the second weighting value are adjusted by an offset term that is a constant, regardless of the number of times the controller has calculated the current movement quantity.

4. The positioning apparatus according to claim 3, wherein the controller is further configured to:
   calculate a reliability of the second satellite positioning coordinate; and
   increase a value of the offset term as the reliability of the satellite positioning coordinates increases.

5. The positioning apparatus according to claim 2, wherein the controller is further configured to:
   calculate a negative term by multiplying a transition speed term and minus 1 with the number of the movement quantities the controller has calculated after the second time and decrease the first weighting value based on the negative term;
   calculate a positive term by multiplying the transition speed term with the number of the movement quantities the controller has calculated after the second time and increase the second weighting value based on the positive term;
   determine a reliability of the current movement quantity; and
   decrease a value of the transition speed term as the reliability of the current movement quantity increases.

6. The positioning apparatus according to claim 1, wherein a sum of the first weighting value and the second weighting value is equal to 1.

7. The positioning apparatus according to claim 2, wherein
   the first weighting value is calculated by a mathematical expression of $1-\alpha-j_k\beta$, and the second weighting value is calculated by a mathematical expression of $\alpha+j_k\beta$;
   with $\beta$ being an offset term, $-j_k\beta$ being the negative term, $+j_k\beta$ being the positive term, $j_k$ being the number of times the controller has calculated the current movement quantity after the second time, and $\beta$ being a value of a transition speed term.

* * * * *